Figure 1:
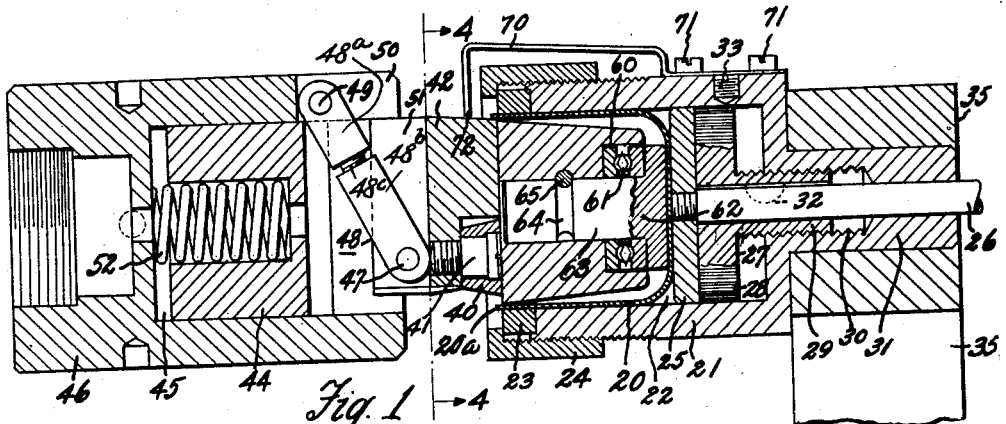

June 2, 1931.  A. W. PHELPS  1,807,671

METAL SHEARING APPARATUS

Filed Feb. 17, 1928  2 Sheets-Sheet 1

Inventor
Alva W. Phelps
By Spencer Hardman & Fehr
his Attorneys

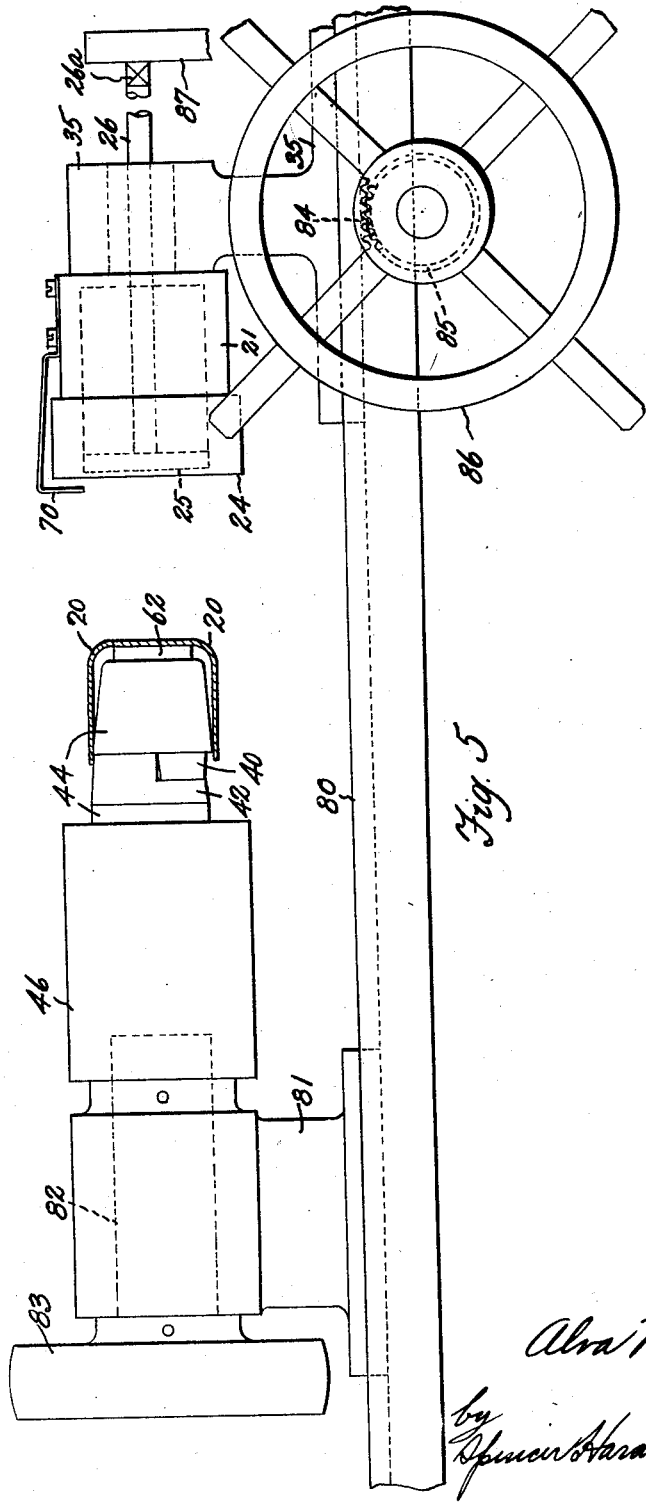

Patented June 2, 1931

1,807,671

UNITED STATES PATENT OFFICE

ALVA W. PHELPS, OF ANDERSON, INDIANA, ASSIGNOR TO DELCO-REMY CORPORATION, OF DAYTON, OHIO, A CORPORATION OF DELAWARE

METAL SHEARING APPARATUS

Application filed February 17, 1928. Serial No. 255,127.

This invention relates to the manufacture of cup-shaped bodies from flat sheet metal and one of the objects of the invention is to provide apparatus for trimming the rough or uneven edge of the cylindrical portion of the body following the operations of extruding it from sheet metal.

The present invention provides a construction which, in the form disclosed, comprises a support defining a recess for receiving a cup and carrying an annular shear blade embracing the cylindrical portion of the cup near the edge which is to be trimmed off, and comprises a support for a second cutter or shear blade adapted to cooperate with the annular shear blade and movable laterally with respect to the axis of the cup-shaped body from a position within the confines of the edge of the cup-shaped body to a position which will cause the edge to be sheared against the annular shear blade. One of the supports is rotatable relative to the other, and one of the supports is movable longitudinally of the axis of the cup-shaped body relative to the other support. The laterally movable shear blade moves laterally with respect to the axis of the cup automatically in response to longitudinal movement of one of the supports relative to the other.

Further objects and advantages of the present invention will be apparent from the following description, reference being had to the accompanying drawings, wherein a preferred form of embodiment of the present invention is clearly shown.

Figure 2:
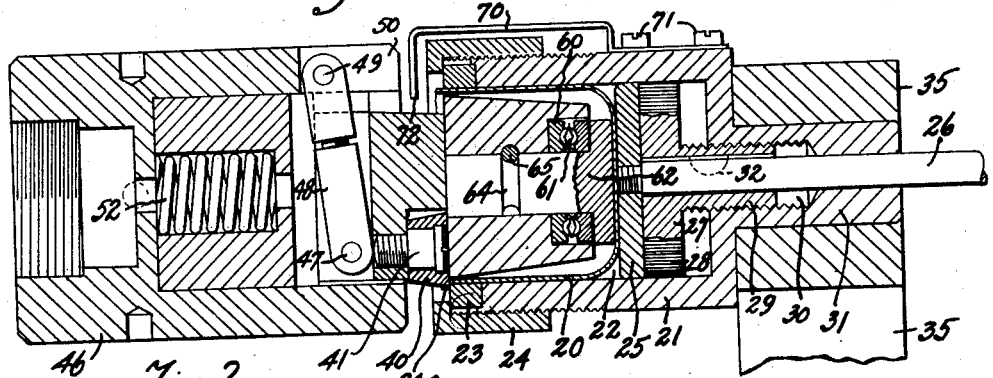
Figure 3:
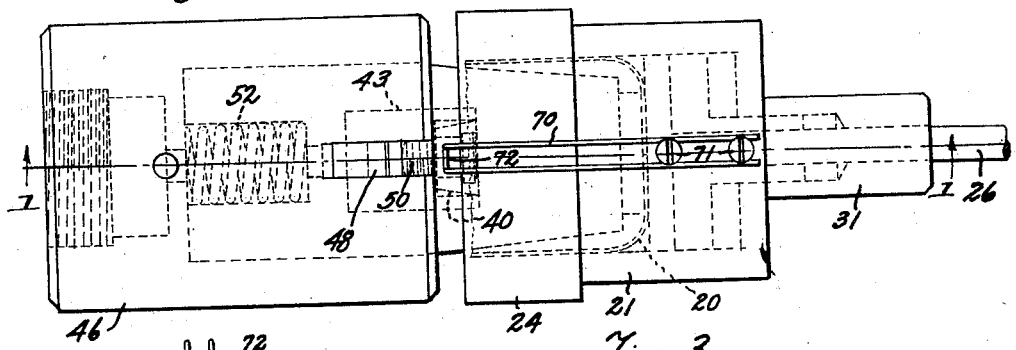
Figure 4:
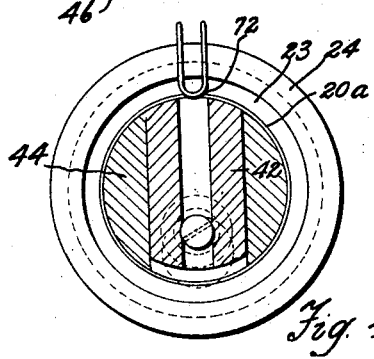

In the drawings:

Figs. 1 and 2 are longitudinal sectional views showing respectively two positions of operation of trimming apparatus embodying the present invention, these views being taken on the line 1—1 of Fig. 3 which is a plan view of the apparatus. Fig. 4 is a sectional view on the line 4—4 of Fig. 1. Fig. 5 is a side view of a machine for operating the trimming apparatus.

The cup-shaped body which has been formed from sheet metal is designated by numeral 20 and is received by a support 21 defining a cylindrical recess 22 formed in part by an annular shear blade 23 removable from the support 21 and secured in position by a nut 24. The recess 22 has a longitudinally movable end wall 25 threadedly connected with a rod 26. The wall 25 is backed by a disc 27 having a knurled cylindrical periphery 28 and having a threaded shank 29 engaging a threaded central bore 30 in the shank portion 31 of the support 21. By turning the rod 26 which is keyed to the disc 27 by key 32 the disc 27 may be rotated and may be moved axially relative to the support 21 due to the threaded connection between the shanks 29 and 31. The disc 27 is prevented from turning by tightening a set screw 33 against the knurled periphery 28 of the disc. The shank 31 is supported by a bracket 35 which is movable in a direction parallel to the axis of the cup-shaped body 20.

The uneven edge portion 20a of the cup-shaped body 20 is sheared against the annular shear blade 23 by a second cutter blade or wheel 40 which is movable laterally with respect to the axis of the cup. The wheel 40 is attached by a screw 41 to a laterally movable arm 42 which is slidable within a transverse guide 43 provided by a block 44. The block 44 is slidable within a recess 45 provided by a shear blade support 46 which is rotatable about an axis substantially in alignment with the axis of the body 20. The arm 42 is connected by a pin 47 with a link 48 which is connected by a pin 49 with the support 46. The link 48 comprises eye-members 48a and 48b joined, as shown in Figs. 1 and 2, by a threaded rod 48c attached to one of the eye-members and received by a threaded hole in the other. By turning one of the eye-members relative to the other the length of the link may be varied for the purpose of varying the eccentricity of the cutter 40 in order that the overlap of the shearing members may be adjusted for the purpose of obtaining the easiest cutting angle between the cutter 40 and the annular blade 23. The support 46 is provided with a notch 50 for receiving the link 48 and the arm 42 is provided with a laterally extending groove 51 for receiving the link 48. A spring 52 which is located between the support 46 and the block 44 tends to urge the block 44 toward the right as viewed in the drawings. Therefore, the pin 47 will be yieldingly maintained in such position as to cause the upper end of the arm 42 as viewed in Fig. 1 to engage the inside of the wall of the block 44 which defines the recess 45. Therefore the relative movement between the block 44 and the support 46 is limited so that the cutter 40 and the arm 42 which carries it may be inserted within the edge 20a of the cup-shaped body 20. The block 44 carries a thrust bearing comprising a relatively movable race 60, anti-friction bearings 61 and a relatively stationary race 62 attached to a shank 63 which is rotatably supported by the block 44. Endwise movement of the shank 63 relative to the block 44 is limited by providing the shank 63 with a groove 64 for receiving a pin 65 which extends laterally through the block 44. The thrust bearing member 62 cooperates with the member 25 to clamp between them the end wall or bottom portion of the cup-shaped body 20. It will be seen that the spring 52 tends to maintain the thrust bearing member 62 yieldingly in engagement with the end wall of the cup 20 and said end wall yieldingly in engagement with the end member 25 in order to prevent the turning of the cup 20.

Preferably, the cutter support 46 is rotatably mounted but does not move endwise. The bracket 35 which carries the support 21 moves endwise relative to the support 46 but does not permit the support 21 to rotate. However, the support 46 could be supported for endwise movement as well as for rotation and the support 21 could be entirely stationary. At any rate, after the cup-shaped body 20 has been clamped between the parts 62 and 25 as shown in Fig. 1, it is apparent that during endwise movement of either of the supports 21 or 45 relative to the other in such direction as to cause one of the supports to approach the other as shown in Fig. 2, the movement of the shear blade or cutter 40 from the position shown in Fig. 1 to that shown in Fig. 2 will take place in order to cause the metal of the cup to be sheared against the annular shear blade 23. During rotation of either the support 46 or the support 21 relative to the other the cutter 40 will cooperate with the shear blade 23 to cut away that portion 20a of the cup 20 which extends to the left beyond the shear block 23. During the separation of the supports 21 and 46 by endwise motion of one of them relative to the other, this ring-shaped piece of metal 20a which has been trimmed off of the cup 20 will be dragged to the outer end of the block 44 by a resilient spring member 70 secured by screws 71 to the support 21 and having an end portion 72 adapted to bear against the arm 42 and the block 44.

Fig. 5 shows diagrammatically a suitable machine for supporting and operating the trimming apparatus. The machine has a bed 80 supporting a bracket 81 rotatably supporting a shaft 82 carrying the cutter head or support 46 and a driving pulley 83. The bed 80 provides ways for guiding the bracket 35 in a direction parallel to the axis of the shaft 82. The bracket 35 carries a rack 84 which meshes with a gear 85 operated by a hand wheel 86. When the bracket 35 is retracted from the cutter head or support 46 as shown in Fig. 5, the work (shown in section at 20) is placed upon the block 44. Then the wheel 86 is turned counterclockwise to cause the work to be clamped as shown in Fig. 1 and the cutter 40 to move against the inside wall of the work or cup 20 as shown in Fig. 2. After the work has been trimmed, the wheel 86 is turned clockwise so as to move the bracket 35 away from the cutter head 46, and during this movement the spring 70 will pull the trimming 20a from the block 44 and the end of rod 26 will strike a stationary stop 87 so as to move the plate 25 into the position shown in Fig. 5 so as to eject the work from the work holder. The rod 26 has flats 26a to receive a wrench for turning the rod and plate 27 so as to vary the distance from the bottom of the work or cup to the shear blade 23.

While the form of embodiment of the present invention as herein disclosed, constitutes a preferred form, it is to be understood that other forms might be adopted, all coming within the scope of the claims which follow.

What is claimed is as follows:

1. Apparatus for cutting a tubular work piece comprising a support for the work piece including an annular shear blade surrounding the work piece, a cutter movable against the interior of the piece to shear the piece against the annular shear blade, means for supporting the cutter, means for rotating one support relative to the other, means for clamping the work piece to the work piece support, and means cooperating with the clamping means for causing the cutter to move toward the annular shear blade during said relative rotary movement.

2. Apparatus for cutting a tubular work piece comprising a support for the work piece including an annular shear blade surrounding the work piece, a cutter movable against the interior of the piece to shear the piece against the annular shear blade, a block for guiding the cutter and engageable with the work piece for clamping the work piece to its support, a second support for the block, said block being carried by and relatively movable axially towards said second support, a spring transmitting yielding pressure between the block and its support, means for rotating one support relative to the other, means for axially moving one support relative to the other to clamp the work piece between the block and the work piece support thereby producing relative axial movement between the block and its support, and means responsive to the relative movement between the block and its support for causing the cutter to move toward the annular shear blade during said relative rotary movement.

3. Apparatus for cutting a tubular work piece comprising a support for the work piece including an annular shear blade surrounding the work piece, a cutter movable against the interior of the piece to shear the piece against the annular shear blade, a block for guiding the cutter and engageable with the work piece for clamping the work piece to its support, a second support for the block having relative axial movement therewith, a spring transmitting yielding pressure between the block and its support, means for axially moving one support relative to the other to clamp the work piece between the block and the work piece support and to produce relative axial movement between the block and its support, means for rotating the cutter block support relative to the work piece support, and means responsive to the relative movement between the block and its support for causing the cutter to move toward the annular shear blade during said relative rotary movement.

4. Apparatus for cutting a tubular work piece comprising a support for the work piece including an annular shear blade surrounding the work piece, a cutter movable against the interior of the piece to shear the piece against the annular shear blade, a block for guiding the cutter and engageable with the work piece for clamping the work piece to its support, a second support for the block having relative axial movement therewith a spring transmitting yielding pressure between the block and its support, means for rotating one support relative to the other, means for axially moving the work-piece support toward the cutter block support to clamp the work piece yieldingly between the block and the work piece support and to produce axial movement of the cutter block relative to its support against the pressure of said spring, and means responsive to the relative movement between the block and its support for causing the cutter to move toward the annular shear blade during said relative rotary movement.

5. Apparatus for cutting a tubular work piece comprising a support for the work piece including an annular shear blade surrounding the work piece, a cutter movable against the interior of the piece to shear the piece against the annular shear blade, a block for guiding the cutter and engageable with the work piece for clamping the work piece to its support, a second support for the block having relative axial movement therewith, a spring transmitting yielding pressure between the block and its support, means for axially moving the work-piece support toward the cutter block support to clamp the work piece yieldingly between the block and the work piece support and to produce axial movement of the cutter block relative to its support against the pressure of said spring, means for rotating the cutter block support relative to the work piece support, and means responsive to the relative movement between the block and its support for causing the cutter to move toward the annular shear blade during said relative rotary movement.

6. Apparatus for trimming the edge of a cup-shaped work piece comprising a cup-shaped work support, an annular shear blade carried by the work support adjacent its outer edge, a disc supported within the work support and axially movable relative thereto, means for clamping the work against said disc, a cutter movable laterally of the work-piece against the shear blade, means for moving the cutter against the shear blade, means for producing relative shearing movement between the cutter and shear blade, and means for effecting relative movement between the disc and work support to eject the work.

7. Apparatus for trimming the edge of a cup-shaped work piece comprising a cup-shaped work support, an annular shear blade carried by the work support adjacent its outer edge, a clamp block receivable within the work support and over which the work may be placed, a second support for said clamp block, having relative axial movement therewith, means for producing relative movement between the block and work support such as to clamp the work against said support, and for producing relative movement between the clamp-block and its support, a cutter carried by the clamp block and guided for lateral movement thereby, means responsive to applying clamping pressure between the clamp-block and work support for causing the cutter to move relative to the annular shear blade, and means for producing a relative rotary shearing movement between the cutter and shear blade.

8. Apparatus for trimming the edge of a cup-shaped work piece comprising a cup-shaped work support, an annular shear blade carried by the work support adjacent its outer edge, a clamp-block receivable within the work support and over which the work may be placed, a rotatable support for the clamp-block having relative axial movement therewith, means for moving the work support axially toward the clamp block to clamp the work against the work support and for causing the clamp-block to move relative to the clamp-block support, a cutter carried by the clamp-block and movable against the annular shear blade, means for causing the cutter thus to move when the clamp-block is moved toward its support, and means for rotating the clamp-block support.

9. A support for a cup-shaped work piece comprising a body having a cylindrical recess; a clamping member for ejecting the work from the recess mounted for axial adjustment in said recess; a rotary member axially movable in said recess and a clamping member carried by the rotary member, said second clamping member cooperating with said first clamping member to hold the cup-shaped work piece.

10. A support for a tubular workpiece comprising a body having a cylindrical recess, a member axially movable in said recess for ejecting the work from the recess, an adjusted stop plate screw-threadedly engaging said body coaxially with respect to the ejecting member and a rod for moving the ejecting member and having an axially slidable driving connection with the stop plate whereby the rod may be moved endwise to move the ejecting member and may be turned to turn the stop plate.

11. Apparatus for cutting a tubular workpiece comprising, in combination, a cutter block support, a cutter block carried solely by the support and guided thereby for relative axial movement, a spring between the support and block for urging the block toward its limit of travel in one direction relative to the support, a cutter carried by the block and guided thereby for transverse movement relative to the support, a work holder for receiving a tubular workpiece, an annular shear blade carried by the work holder and adapted to engage the exterior of the workpiece, a stop for axially engaging the cutter block, means for producing relative axial movement between the support and work holder to cause the block to engage the stop and thereafter relative movement to take place between the cutter block and its support, means responsive to said relative axial movement between the cutter block and its support for causing the cutter to move into cooperative relation to the annular shear blade, and means for producing relative rotation between the cutter block support and work holder.

12. Apparatus for cutting a tubular workpiece comprising, in combination, a cutter block support, a cutter block carried solely by the support and guided thereby for relative axial movement, a spring between the support and block for urging the block toward its limit of travel in one direction relative to the support, a cutter carried by the block and guided thereby for transverse movement relative to the support, a work holder for receiving a tubular workpiece, an annular shear blade carried by the work holder and adapted to engage the exterior of the workpiece, a stop for axially engaging the cutter block, means for producing relative axial movement between the support and work holder to cause the block to engage the stop and thereafter relative movement to take place between the cutter block and its support, a link connecting the cutter and cutter block support for causing the cutter to move into cooperative relation to the annular shear blade in response to relative axial movement between the cutter block and its support, and means for producing relative rotation between the cutter block support and work holder.

In testimony whereof I hereto affix my signature.

ALVA W. PHELPS.